United States Patent [19]
Howeth

[11] Patent Number: 4,650,504
[45] Date of Patent: Mar. 17, 1987

[54] HOPPER LOADING DIRECTLY INSERTABLE HORIZONTALLY MOUNTED CYLINDRICAL SEGMENTED BORE PLEATED FILTER SYSTEM FOR ROTARY BROOM SWEEPERS

[76] Inventor: D. Franklin Howeth, 233 Chuck Wagon Trail, Fort Worth, Tex. 76108

[21] Appl. No.: 757,011

[22] Filed: Jul. 19, 1985

[51] Int. Cl.⁴ ............................................. B01D 45/18
[52] U.S. Cl. ...................................... 55/302; 55/498; 55/493; 55/508; 210/232; 15/310; 15/346
[58] Field of Search .................. 55/289, 306, 302–304, 55/481, 492, 497, 498, 512, 508, 424–426, 510, 511, 493; 15/310, 346, 316 R, 349, 352; 210/232, 411, 493.1, 493.2

[56] References Cited

U.S. PATENT DOCUMENTS

| | | | |
|---|---|---|---|
| 2,374,756 | 5/1945 | Kisch et al. | 210/232 |
| 2,475,808 | 7/1949 | Storm | 55/498 X |
| 3,307,336 | 3/1967 | Dewsberry | 55/510 X |
| 3,317,043 | 5/1967 | Vanderpoel | 210/232 X |
| 3,510,002 | 5/1970 | Evans | 210/232 |
| 3,786,920 | 1/1974 | Raymond | 210/232 X |
| 4,007,026 | 2/1977 | Groh | 55/302 |
| 4,063,913 | 12/1977 | Kippel et al. | 55/498 X |
| 4,214,882 | 7/1980 | Brenholt | 55/302 |
| 4,222,754 | 9/1980 | Horvat | 55/283 |

FOREIGN PATENT DOCUMENTS 0575641 2/1946 United Kingdom ................. 55/493

Primary Examiner—Charles Hart
Attorney, Agent, or Firm—Hubbard, Thurman, Turner & Tucker

[57] ABSTRACT

Disclosed is an air filtration and filter mounting system. The system includes a clean air plenum having a wall with an inlet opening therein. A pair of substantially parallel tension bars are connected to and extend perpendicular to the plenum wall spaced on opposite sides of the plenum inlet. A gimbal plate is slidingly mounted on the tension bars. A filter element is positioned between the tension bars and between the gimbal plate and the plenum wall about the inlet opening. A clamping bar is fixedly connected to the tension bars outward of the gimbal plate and a screw is threadedly engaged with the clamping bar to urge the gimbal plate into clamping engagement with the filter element.

25 Claims, 5 Drawing Figures

HOPPER LOADING DIRECTLY INSERTABLE HORIZONTALLY MOUNTED CYLINDRICAL SEGMENTED BORE PLEATED FILTER SYSTEM FOR ROTARY BROOM SWEEPERS

BACKGROUND OF THE INVENTION

A. Field of the Invention

The present invention relates generally to air filtration systems, and more particularly to a filtration system for use in a rotary broom sweeper having a horizontally mounted cylindrical segmented bore filter that is directly insertable through the top of the hopper of the rotary broom sweeper.

B. Description of the Prior Art

In the art of power sweepers and similar types of equipment, various attempts have been made to develop air filters for removing the dust entrained in the sweeper vacuum air flow. Conventional power sweepers are typically provided with a hopper, which may include a vacuum or suction air flow system including a filter which is periodically cleaned by vibrating the filter element or by removing and replacing the filter element. There are several disadvantages associated with the prior art type power sweeper filters and an important aspect of the filter system requires that the filter be very compact, be capable of sustaining high loadings of particulate material entrained in the sweeper suction air stream and be capable of automatic or selective cleaning operations without removing the filter from the hopper.

In U.S. patent application Ser. No. 680,942, filed Dec. 12, 1984, there is disclosed a sophisticated self-cleaning filter system for use in sweepers adapted for severe environments. The system of application Ser. No. 680,942 includes a single vertically oriented segmented bore oval filter. The oval filter provides substantial filter surface with a minimum vertical height. Among other desirable features, that system provides ideal vertical positioning of filter media pleating to enhance reverse flushing of the dust cake and provides adequate media surface in a single filter that is easily accessed for replacement.

The oval filter, however, is rather uncommon in pleated media filters. The most common filter form in industry is of a cylindrical open bore with one end of the bore closed by an endcap and having a mounting drawbolt hole located on the center axis of the cylinder for the purpose of mounting the filter within the cabinetry. A cylindrical filter having filter media area equal to an oval filter and mounted in its normal vertical position relative to pleat lay would have excessive length relative to hopper depth for use in a rotary broom sweeper. In other words, due to geometric constraints on the construction of the hopper, a vertically mounted pleated media filter with its associated self-cleaning apparatus would require a housing too tall to fit practically within the hopper of a rotary broom sweeper.

Accordingly, it is an object of the present invention to provide a filter system that overcomes the shortcomings of the prior art. More particularly, it is an object of the present invention to provide a self-cleaning filtration system for a mobile rotary broom sweeper utilizing a single cylindrical filter mounted in a horizontal position wherein the filter is inserted into the hopper in a direction perpendicular to the axis of the filter element, as for example through the top of the mobile rotary broom sweeper hopper.

It is a further object of the present invention to provide a self-cleaning filtration system for a mobile rotary broom sweeper which includes a single horizontally mounted filter element within the debris hopper in which the filter element is inserted through the normal hopper entry means into a cradle, which guides and supports the filter element during installation.

It is yet a further object of the present invention to provide a cylindrical pleated filter mounting system that provides for filter inserting in a direction perpendicular to the major axis of the filter, which may be either horizontal or vertical.

It is a further object of the present invention to provide a cylindrical pleated filter with a permanently segmented bore which permits a single filter to act as multiple filters for a filter mounting system as herein described.

SUMMARY OF THE INVENTION

Briefly stated, the foregoing and other objects are accomplished by the air filtration and mounting system of the present invention. The air filtration system of the present invention includes a clean air plenum that includes a wall having an inlet opening therein to receive filtered air. A pair of substantially parallel tension bars are connected to and extend substantially perpendicular from the plenum wall and are spaced apart on opposite sides of the plenum inlet. A gimbal plate is positioned between the tension bars and means are provided for urging the gimbal plate into engagement with the filter element, which in turn is urged into engagement with the plenum wall. Preferably, the urging means includes a clamping bar fixedly connected between the tension bars outward of the gimbal plate. A screw threaded member is threadedly engaged with the clamping bar and abuttingly engaged with the gimbal plate, whereby turning of the screw member advances the gimbal plate along the tension bars.

The invention finds particular application in a horizontally mounted filter system for use in a mobile rotary broom sweeper. However, the system of the present invention is also adaptable to vertically mounted filter systems. In either event, the invention is particularly useful in that the cylindrical filter element is insertable perpendicular to its major axis. In the horizontal mode, the gimbal plate is preferably slidingly mounted on the tension bars and the invention preferably includes a cradle arrangement for supporting the filter element when it is inserted between the plenum wall and gimbal plate. The cradle arrangement conveniently includes a pair of spaced apart semicircular cradle members supported between the tension bars.

The filter element of the present invention preferably includes one or more partition panels for dividing the bore of the filter element into a plurality of segments. Each of the segments is associated with an arc of surface of the filter that may be readily cleaned by reverse flushing of pressure air. The segmented bore filter thus may be larger than a single nonsegmented bore filter and accordingly has a greater filter capacity. The invention advantageously includes a diverter structure positioned along the top of the horizontally mounted filter element. The diverter structure functions to divert or deflect laterally dust flushed from the upper segments of the filter element. The diverter structure thus prevents flushed particulate matter from being redeposited on the filter element.

DESCRIPTION OF THE PREFERRED EMBODIMENT

Figure 1:
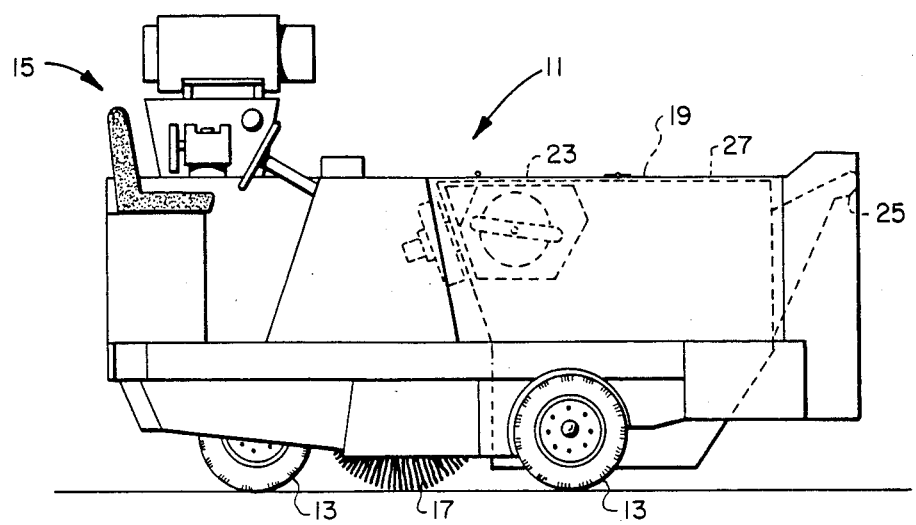
FIG. 1 is a side elevation view of a mobile rotary broom sweeper incorporating the filtration system of the present invention.

Referring now to the drawings, and first to FIG. 1, a mobile rotary broom sweeper is designated generally by the numeral 11. Sweeper 11 is self-propelled by means of wheels 13. Sweeper 11 is controlled by an operator who sits at a control station designated generally by the number 15.

Sweeper 11 includes a horizontally mounted cylindrical rotary broom 17 that is driven to rotate in the direction opposite to the direction of travel of sweeper 11. The rotation of broom 17 causes dust and debris to be dislodged from the surface upon which sweeper 11 is driven and swept into a dust and debris collection hopper 19. Hopper 19 is a generally box-like container having opposed side walls 21a and 21b (best shown in FIG. 3) and a top wall 23. Hopper 19 is pivotally mounted to sweeper 11 by means of support brackets 25 (one of which is shown) for movement between a working position, as shown in FIG. 1, and an elevated dumping position (not shown). A discharge door 27 is provided in top wall 23 of hopper 19 to open when hopper 19 is in the discharge position to discharge dust and debris collected within hopper 19.

Figure 2:
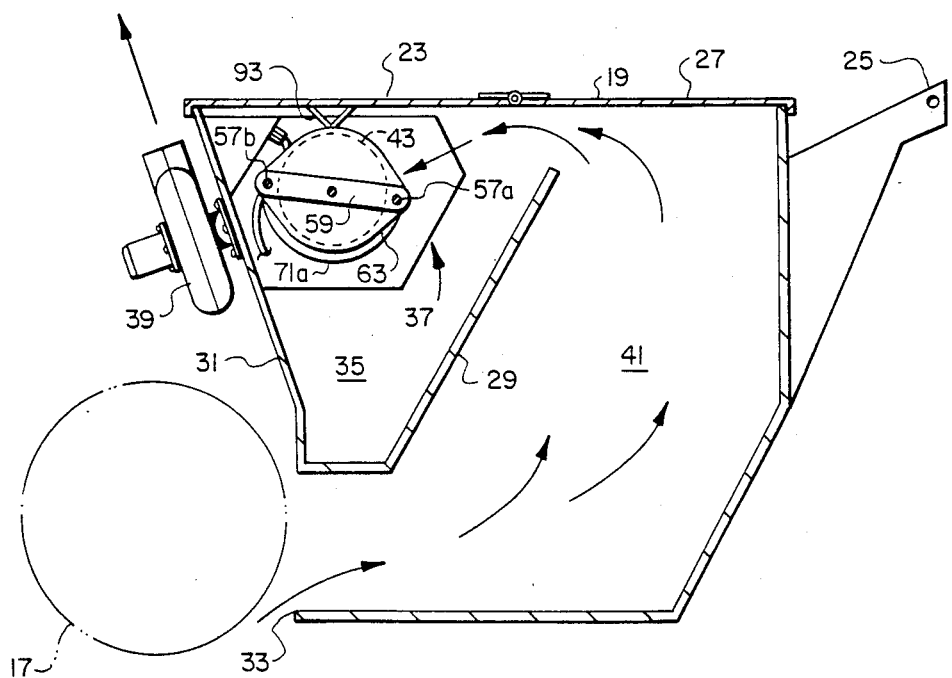
FIG. 2 is a sectional view showing details of the hopper of the mobile rotary broom sweeper of FIG. 1.

Referring particularly to FIG. 2, hopper 19 typically includes an interior partition 29 extending from the rear wall 31 of hopper 19 above a dust and debris inlet 33. Interior partition 29 forms an interior dust chamber 35 within which is disposed an air filtration system designated generally by the numeral 37. A suction air pump or fan 39 is provided for inducing air flow through the interior of hopper 19 from inlet 33 through filtration system 37 in the manner shown by arrows in FIG. 2. Relatively heavy particles of debris and dirt settle at the bottom of the main chamber 41 of hopper 19 while the lighter dust-like particles flow around interior partition 29 and onto the surface of a filter element 43 of air filtration system 37. The dust cake collected on filter element 43 is periodically dislodged and is collected at the bottom of dust chamber 35.

Figure 3:
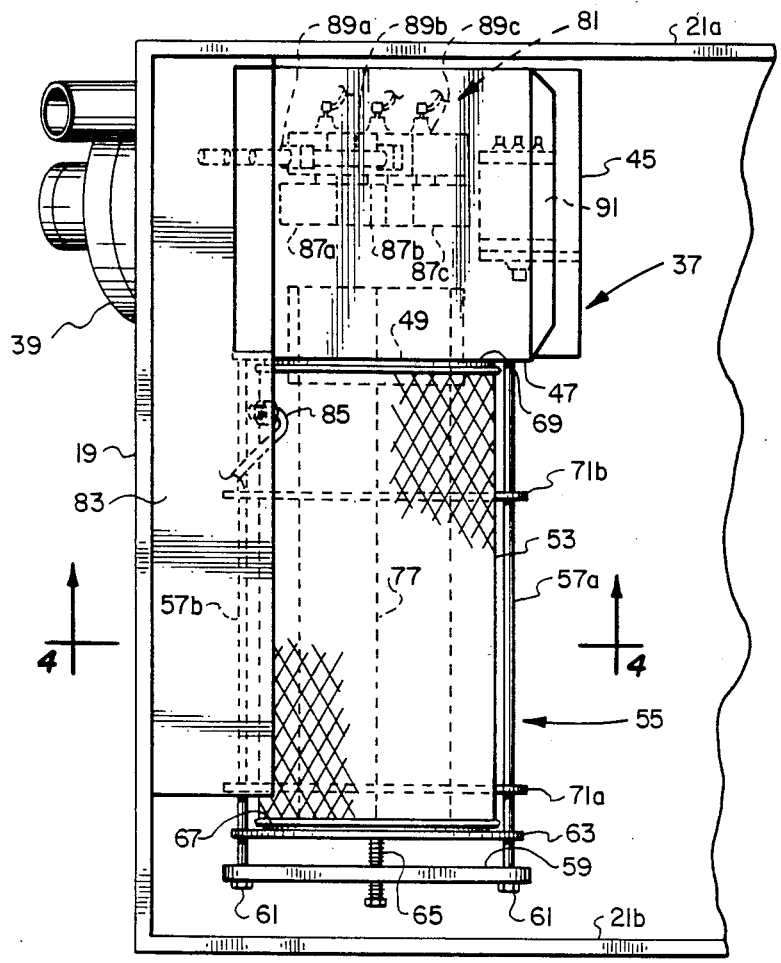
FIG. 3 is a top plan view showing details of the filtration system of the present invention.
Figure 4:
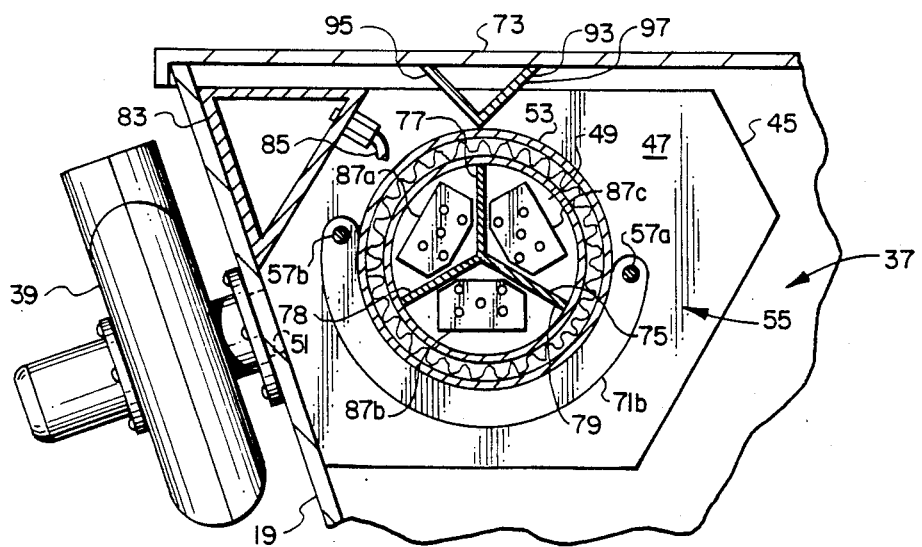
FIG. 4 is a sectional view along line 4—4 of FIG. 3.

Referring now to FIGS. 3 and 4, air filtration system 37 includes a clean air plenum 45 disposed in hopper 19 adjacent one side wall 21a. Hopper 19 is a generally box-like structure having an end wall 47 having an inlet port 49 therein. Clean air plenum includes an outlet port 51 connected to suction air pump 39. Operation of suction pump 39 thus causes air to flow into clean air plenum 45 through inlet port 49.

Air filtration system 37 also includes a horizontally mounted cylindrical pleated porous media filter element 53. Filter element 53 is supported against end wall 47 of clean air plenum about inlet port 49 by a mounting system designated generally by the numeral 55.

Mounting system 55 includes a pair of spaced apart substantially parallel tension bars 57a and 57b. Tension bars 57a and 57b are connected to vertical end wall 47 on opposite sides of inlet port 49 of clean air plenum 45. Tension bars 57a and 57b extend horizontally across hopper 19 to the vicinity of side wall 21b.

A clamping bar 59 is fixedly connected between tension bars 57a and 57b adjacent side wall 21b. Bolt head members 61 prevent clamping bar 59 from moving outwardly along tension bars 57a and 57b. Accordingly, outward forces on clamping bar 59 are transmitted to tension bars 57a and 57b.

A gimbal plate 63 is slidingly supported on tension bars 57a and 57b between end wall 47 of clean air plenum 45 and clamping bar 59. As best shown in FIG. 2, gimbal plate 63 is generally circular but has extending portions which engage tension bars 57a and 57b. Gimbal plate 63 is large enough to cover the end of filter element 53.

A bolt 65 is threadedly engaged in clamping bar 59. The end of bolt 65 abuts gimbal plate 63 and turning of bolt 65 causes gimbal plate 63 to move back and forth along tension bars 57a and 57b.

An end seal 67 is disposed between gimbal plate 63 and one end of filter element 53. Similarly, an end seal 69 is disposed between the other end of filter element 53 and end wall 47 of clean air plenum 45 about inlet port 49. Gimbal plate 63 urges end seal 67 into sealing engagement with filter element 53, which in turn urges filter element 53 into sealing engagement with end seal 69 and end wall 47. Mounting system 55 includes a pair of spaced apart semicircular cradle members 71a and 71b positioned on tension bars 57a and 57b. Cradle members 71a and 71b cradle and thereby provide vertical support to filter element 53. Cradle members 71a and 71b are particularly useful during insertion and removal of filter element 53 with respect to mounting system 55. Cradle members 71a and 71b support filter element 53 in proper alignment while gimbal plate 63 is advanced into and out of contact with end seal 67. However, cradles members 71a and 71b also provide vertical support to filter element 53 during operation so that vibration and the like does not dislodge filter element 53. A top door 73 is provided in hopper 19 to provide access for insertion and removal of filter element 53.

While the preferred embodiment of mounting system 55 of the present invention is horizontally disposed, those skilled in the art will recognize that the tension bar mounting system of the present invention would find ready application in other systems, as for example ones including vertically mounted filter elements. The mounting system of the present invention allows for insertion and removal of the filter element in a direction perpendicular to the major access of the filter element. The mounting system of the present invention is particular advantageous in situations where there is not sufficient space to enable the filter element to be removed or inserted in a direction parallel to the filter axis.

Figure 5:
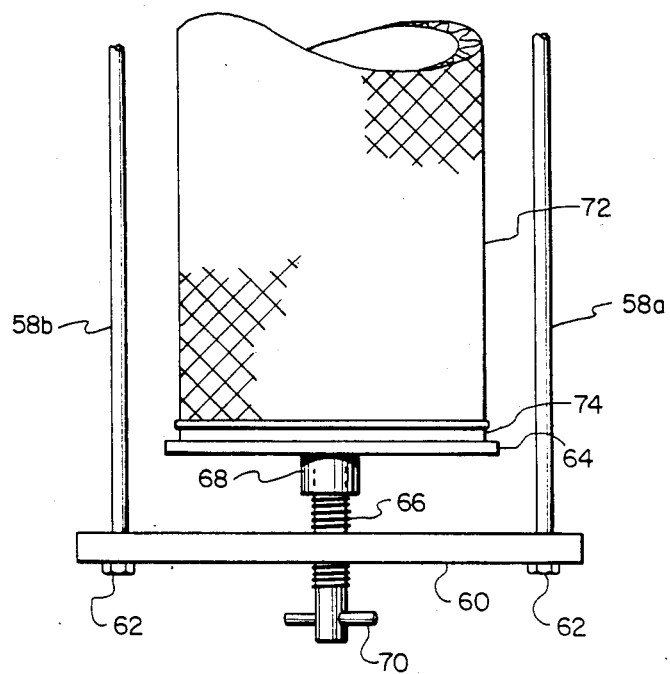
FIG. 5 is a detail view of an alternative embodiment of the filter mounting system of the present invention.

Referring now to FIG. 5, there is disclosed an alternative embodiment of the filter mounting system of the present invention that is particularly adapted to a vertically mounted filter element. The system of FIG. 5 includes a pair of spaced apart substantially parallel tension bars 58a and 58b. Tension bars 58a and 58b are connected to plenum wall (not shown) in the manner of tension bars 57a and 57b of FIGS. 3 and 4. Tension bars 58a and 58b are preferably vertically oriented, but they may be horizontal or at some other orientation.

Tension bars 58a and 58b have fixedly connected therebetween a clamping bar 60. Tension bars 58a and 58b include bolt head members 62 which engage clamping bar 60 and prevent clamping bar 60 from moving outwardly along tension bars 58a and 58b, thereby to transmit outwardly directed forces on clamping bar 60 to tension bars 58a and 58b.

A gimbal plate 64 is positioned between tension bars 58a and 58b and supported by a screw threaded member 66 threadedly engaged with clamping bar 60. A cylindrical sleeve 68 is connected to gimbal plate 64 and overfits the end of screw threaded member 66. Cylindrical sleeve 68 provides stability to gimbal plate as screw threaded member 66 is advanced and retracted with respect to clamping bar 60. Screw threaded member 66 preferrably includes a handle 70 which facilitates manual turning of screw threaded member 66.

Gimbal plate 64 supports a cylindrical pleated porous media filter element 72. Preferably, a seal 74 is disposed between filter element 72 and gimbal plate 64. Screw threaded member 70 urges seal 74 into engagement with filter element 72 which in turn is urged into engagement with the plenum wall (not shown). Filter element 72 is thus placed in compression along its major axis between tension bars 58a and 58b.

Returning now to FIGS. 3 and 4, filter element 53 includes means for segmenting the bore into a plurality of flow chambers. In the preferred embodiment, the means for segmenting the bore includes a elongated partition member 75. In the preferred embodiment, partition member 75 includes three partition panels 77, 78, and 79, which divide the bore of filter element 53 into three longitudinally extending segments. Partition member 75 may be either permanently affixed within the bore of filter element 53 or removable therefrom.

Air filtration system 37 includes a reverse flushing system shown in phantom in FIG. 3 and designated generally by the numeral 81. Flushing system 81 is supplied with compressed air from a compressor (not shown) and is adapted to send periodic blasts of air into the bore of filter element 53 in the direction opposite the normal flow of air, thereby to dislodge dust cake from the surface of filter element 53.

Reverse flushing system 81 includes a flushing air reservoir 83 which receives compressed air through a hose 85. Flushing air reservoir 83 supplies compressed air to a set of flushing heads 87a, b, and c, best shown in FIG. 4, through flushing valves 89a, b, and c, respectively. Flushing valves 89a, b, and c, are adapted to open sequentially, as by means of a sequencer 91 thereby to flush filter element 53. The details of the operation of reverse flushing system 81 do not form part of the present invention and have been omitted for clarity.

Because of the horizontal disposition and pleated nature of filter element 53, it has been found that dust cake flushed from the topmost portions of filter element 53 may have a tendency to become redeposited on filter element 53 rather than being blown clear. For example, when flushing head 87a flushes its associated segment, air is still flowing in the normal direction through the segments of filter element 53 associated with flushing heads 87b and 87c. Thus, dust cake dislodged from the segment associated with flushing head 87a may tend to travel across the top of filter element 53 and become deposited on the segment associated with flushing head 87c. Accordingly, the present invention includes a diverter or deflector element 93. Diverter element 93 is an elongated downwardly pointing V-shaped structure having diverter veins 95 and 97. Diverter element 93 is positioned in close proximity to the upper surface of filter element 53 and runs parallel thereto. Preferably, diverter element 93 is attached to the underside of door 73. Partition member 75 is preferably arranged within filter element 53 such that partition panel 77 is vertically upstanding to underlie diverter element 93. Accordingly, dust cake dislodged from the surface of filter element on one side of panel 77 is deflected laterally so as not to be redeposited on the other side of panel 77.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment. Various changes may be made in the shape, size, and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. An air filtration system, which comprises:
   a clean air plenum, said clean air plenum, said clean air plenum including a substantially vertical wall having an inlet opening therein;
   a pair of substantially horizontal parallel tension bars connected to and extending substantially perpendicular to said plenum wall spaced apart on opposite sides of said plenum inlet;
   a gimbal plate positioned between said tension bars;
   a filter element positioned between said tension bars and between said gimbal plate and said plenum wall about said inlet opening;
   cradle means for supporting said filter element between said tension bars;
   and means operably connected to said tension bars for urging said gimbal plate into engagement with said filter element thereby to urge said filter element into engagement with said plenum wall.

2. The air filtration system as claimed in claim 1, including:
   means for sealing between said filter element and said wall.

3. The air filtration system as claimed in claim 2, including:
   means for sealing between said filter element and said gimbal plate.

4. The air filtration system as claimed in claim 1, wherein said means for urging said gimbal plate into engagement with said filter element includes:
   a clamping bar fixedly connected between said tension bars outward of said gimbal plate;
   and screw means for urging said gimbal plate and said clamping bar apart from each other.

5. The filtration system as claimed in claim 1, including partition means for dividing the interior of said filter element into at least two separate longitudinal segments.

6. The filtration system as claimed in claim 5, including reverse jet air discharge means disposed adjacent to said plenum inlet for discharging jets of pressure air to backflush said filter element segments.

7. The filtration system as claimed in claim 6, wherein said partition means includes a vertically upstanding partition panel and said system includes diverter means extending substantially parallel to the exterior of said filter element adjacent to said vertically upstanding partition panel for diverting laterally material flushed from said filter element, thereby to prevent material flushed from the filter element on one side of said vertically upstanding partition panel from being redeposited on the other side of said panel.

8. The filtration system as claimed in claim 1, wherein said gimbal plate is slidingly mounted on said tension bars.

9. A dust and debris collection system for use in a mobile rotary broom sweeper, said system comprising:
a hopper positioned in said sweeper, said hopper including a dust and debris inlet and a top wall and a pair of spaced apart side walls;
clean air plenum positioned in said hopper, said clean air plenum including a vertical wall having an inlet opening therein;
a gimbal plate supported in said hopper for lateral movement with respect to said plenum wall;
a filter element positioned between said gimbal plate and said plenum wall;
cradle means for supporting said element between said plenum wall and said gimbal plate;
and means for urging said gimbal plate into engagement with said filter element, thereby to urge said filter element into engagement with said plenum wall.

10. The dust and debris collection system as claimed in claim 9, wherein said means for urging said gimbal plate includes:
a pair of horizontally extending tension bars connected to said plenum on opposite sides of said plenum inlet, said gimbal plate being slidingly mounted between said tension bars;
a clamping bar fixedly connected between said tension bars outward of said gimbal plate;
and screw means for urging said gimbal plate and said clamping bar apart from each other.

11. The dust and debris collection system as claimed in claim 9, wherein said cradle means includes a pair of spaced apart cradle members connected between said tension bars.

12. The dust and debris collection system as claimed in claim 9, including door means in said top wall of said hopper for permitting insertion and removal of said filter element between said tension bars.

13. The dust and debris collection system as claimed in claim 9, including partition means for dividing the interior of said filter element into at least two longitudinal segments.

14. The dust and debris collection system as claimed in claim 13, wherein said partition means is permanently affixed in the bore of said filter.

15. The dust and debris collection system as claimed in claim 13, wherein said partition means is removable from the bore of said filter.

16. The dust and debris collection system as claimed in claim 13, including reverse jet discharge means disposed adjacent to said plenum inlet for discharging jets of pressure air to backflush said filter element segments.

17. The dust and debris collection system as claimed in claim 16, wherein said partition means includes a vertically upstanding partition panel and said system includes diverter means extending substantially parallel to the exterior of said filter element above said vertically upstanding panel for diverting lateral material flushed from said filter element.

18. The dust and debris collection system as claimed in claim 17, including door means for permitting insertion and removal of said filter element through said top wall of said hopper.

19. The dust and debris collection system as claimed in claim 18, wherein said diverter means includes a downwardly pointing elongated V-shaped member connected to said door means.

20. Apparatus for mounting a filter element in engagement with a substantially vertically oriented air plenum wall of a filtration system, which comprises:
a pair of spaced apart substantially horizontal parallel tension bars extending substantially perpendicular from said plenum wall;
a clamping bar fixedly connected between said tension bars;
cradle means for supporting said filter element between said tension bars;
a gimbal plate positioned between said tension bars and between said plenum wall and said clamping bar;
and means for urging said gimbal plate apart from said clamping bar.

21. The apparatus as claimed in claim 20, wherein said urging means includes a screw threaded member threadedly engaged with said clamping bar.

22. The apparatus as claimed in claim 20, wherein said gimbal plate is slidingly supported between said tension bars.

23. The apparatus as claimed in claim 20, wherein said cradle means includes a pair of spaced apart semi-circular cradle members connected between said tension bars.

24. The apparatus as claimed in claim 20, wherein said urging means includes a screw threaded member threadedly engaged with said clamping bar and said gimbal plate is supported by said screw threaded member.

25. An air filtration system, which comprises:
a clean air plenum, said clean air plenum including a substantially vertical wall having an inlet opening therein;
a pair of substantially horizontal parallel tension bars connected to and extending substantially perpendicular to said plenum wall spaced apart on opposite sides of said plenum inlet;
a gimbal plate positioned between said tension bars;
a filter element positioned between said tension bars and between said gimbal plate and said plenum wall about said inlet opening;
partition means for dividing the interior of said filter element into at least two longitudinal segments, said partition means including a vertically upstanding partition panel;
reverse jet air discharge means disposed adjacent to said plenum inlet for discharging jets of pressure air to backflush said filter element segments;
diverter means extending substantially parallel to the exterior of said filter element adjacent to said vertically upstanding partition panel for diverting laterally material flushed from said filter element, thereby to prevent material flushed from the filter element on one side of said vertically upstanding partition panel from being redeposited on the other side of said panel;
and means operably connected to said tension bars for urging said gimbal plate into engagement with said filter element thereby to urge said filter element into engagement with said plenum wall.

* * * * *